US008758250B2

(12) United States Patent  
Park et al.

(10) Patent No.: US 8,758,250 B2  
(45) Date of Patent: Jun. 24, 2014

(54) ULTRASOUND COLOR DOPPLER IMAGING SYSTEM AND METHOD FOR FILTERING CLUTTER SIGNAL OF THE SAME

(75) Inventors: Sung Bae Park, Chuncheon Si (KR); Moo Ho Bae, Seoul (KR); Tae Yun Kim, Seoul (KR)

(73) Assignee: Samsung Medison Co., Ltd., Gangwon-Do (KR)

( * ) Notice: Subject to any disclaimer, the term of this patent is extended or adjusted under 35 U.S.C. 154(b) by 540 days.

(21) Appl. No.: 12/959,030

(22) Filed: Dec. 2, 2010

(65) Prior Publication Data

US 2011/0137174 A1    Jun. 9, 2011

(30) Foreign Application Priority Data

Dec. 2, 2009  (KR) .................. 10-2009-0118439

(51) Int. Cl.
*A61B 8/00*          (2006.01)
(52) U.S. Cl.
USPC ........................... 600/454; 382/128; 382/275
(58) Field of Classification Search
None
See application file for complete search history.

(56) References Cited

U.S. PATENT DOCUMENTS

| 6,296,612 | B1  | 10/2001 | Mo et al. |
| 6,322,509 | B1* | 11/2001 | Pan et al. ................... 600/443 |
| 6,760,486 | B1* | 7/2004  | Chiao et al. ................ 382/274 |
| 2002/0169378 | A1  | 11/2002 | Mo et al. |
| 2003/0097068 | A1* | 5/2003  | Hossack et al. ............ 600/443 |
| 2009/0069675 | A1  | 3/2009  | Srinivasan |
| 2010/0149920 | A1  | 6/2010  | Lee et al. |

FOREIGN PATENT DOCUMENTS

JP        2001-137243 A    5/2001
KR    10-2010-0070232 A    6/2010

OTHER PUBLICATIONS

Extended European Search Report issued in European Patent Application No. EP 10188449.2 dated May 22, 2013.
Korean Notice of Allowance, w/ English translation thereof, issued in Korean Patent Application No. KR 10-2009-0118439 dated Mar. 28, 2011.

* cited by examiner

*Primary Examiner* — Unsu Jung
*Assistant Examiner* — Amanda Lauritzen Moher
(74) *Attorney, Agent, or Firm* — McDermott Will & Emery LLP

(57)    ABSTRACT

Disclosed is an ultrasound color Doppler image system. The ultrasound color Doppler image system includes a calculation unit that calculates a mean value associated with an I/Q signal corresponding to a pixel of a color image in an ultrasound image and generates a multiplication value using the calculated mean value; a comparison unit that compares the generated multiplication value with the mean value; and a masking unit that performs masking of the pixel based on a comparison result, and, the calculation unit calculates the mean value of the I/Q signal for each frame, selects a reference mean value based on scales of the calculated mean values, and generates the multiplication value by multiplying the selected reference mean value and a scale factor.

11 Claims, 7 Drawing Sheets

ULTRASOUND COLOR DOPPLER IMAGING SYSTEM AND METHOD FOR FILTERING CLUTTER SIGNAL OF THE SAME

CROSS-REFERENCE TO RELATED APPLICATION

This application claims the benefit of Korean Patent Application No. 10-2009-0118439, filed on Dec. 2, 2009, in the Korean Intellectual Property Office, the disclosure of which is incorporated herein by reference.

BACKGROUND

1. Field

The present invention relates to an ultrasound color Doppler image system, and more specifically, to an ultrasound color Doppler image system that filters a clutter signal from a color Doppler image.

2. Description of the Related Art

An ultrasound color Doppler image system may emit an ultrasound to a human body and may measure a Doppler shift frequency of the ultrasound reflected from a blood flow, thereby detecting a distribution of the blood flow in a real time.

Although the emitted ultrasound is well focused on the blood flow, a part of the ultrasound may be emitted in an undesired direction, and thus, a reflection signal reflected from the blood flow may be returned together with an undesired signal reflected from other tissue besides the blood flow. In this instance, the reflection signal from the blood flow is referred to as a Doppler signal, and the undesired signal reflected from other tissue is referred to as a clutter signal.

Usually, when the ultrasound is well focused, most of ultrasound energy may be transmitted to a focal point, and a relatively small portion of the ultrasound energy may leak to the outside, and thus, a desired signal from the focal point may be mostly returned. However a reflectivity of blood flow is relatively small compared with a reflectivity of peripheral tissue, such as a vessel wall, a muscle, and the like, and thus, in general, the clutter signal is greater than the Doppler signal even though a relatively small amount of ultrasound energy generally leaks.

When there is little movement of the peripheral tissue, a Doppler shift frequency is relatively close to zero, and thus, it is generally well-known that the clutter signal is easily eliminated by a high-pass clutter filter. Also, when movement of the peripheral tissue becomes faster, the Doppler shift frequency of the clutter signal may increase. Accordingly, the clutter signal may not be completely eliminated with a general clutter filter, and thus, an aberrant color may appear on a screen. The fast movement of the tissue may be displayed as though the fast movement is the blood flow. The aberrant color is an artifact displayed on the screen, and the artifact may appear as an instantaneous flash on the screen, thereby being referred to as a flash artifact.

SUMMARY

An aspect of the present invention provides an apparatus and a method that filters a clutter signal to eliminate a flash artifact component from a color Doppler image.

Another aspect of the present invention provides an apparatus and a method that eliminates a clutter signal from both a wideband frequency, and a narrowband frequency.

According to exemplary embodiments of the present invention, there may be provided an ultrasound color Doppler image system, the system including a calculation unit to calculate a mean value associated with an I/Q signal corresponding to a pixel of a color image in an ultrasound image, and to generate a multiplication value using the calculated mean value, a comparison unit to compare the generated multiplication value with the mean value, and a masking unit to perform masking of the pixel based on a comparison result.

The calculation unit may calculate the mean value of the I/Q signal for each frame, may select a reference mean value based on scales of the calculated mean values, and may generate the multiplication value by multiplying the selected reference mean value and a scale factor.

According to exemplary embodiments of the present invention, there may be provided a method of filtering a clutter signal in an ultrasound color Doppler image system, the method including calculating a mean value associated with an I/Q signal corresponding to a pixel of a color image in an ultrasound image, generating a multiplication value using the calculated mean value, comparing the generated multiplication value with the mean value, and performing a masking of the pixel based on a comparison result.

The calculating may calculate the mean value of the I/Q signal for each frame. The generating of the multiplication value may select a reference mean value based on scales of calculated mean values; and may generate the multiplication value by multiplying the selected reference mean value and a scale factor.

Additional aspects and/or advantages will be set forth in part in the description which follows and, in part, will be apparent from the description, or may be learned by practice of the embodiments.

EFFECT

According to exemplary embodiments of the present invention, a clutter signal is filtered, and thus, a flash artifact component is eliminated from a color Doppler image.

According to exemplary embodiments of the present invention, a clutter signal is eliminated from both a wideband frequency, and a narrowband frequency.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
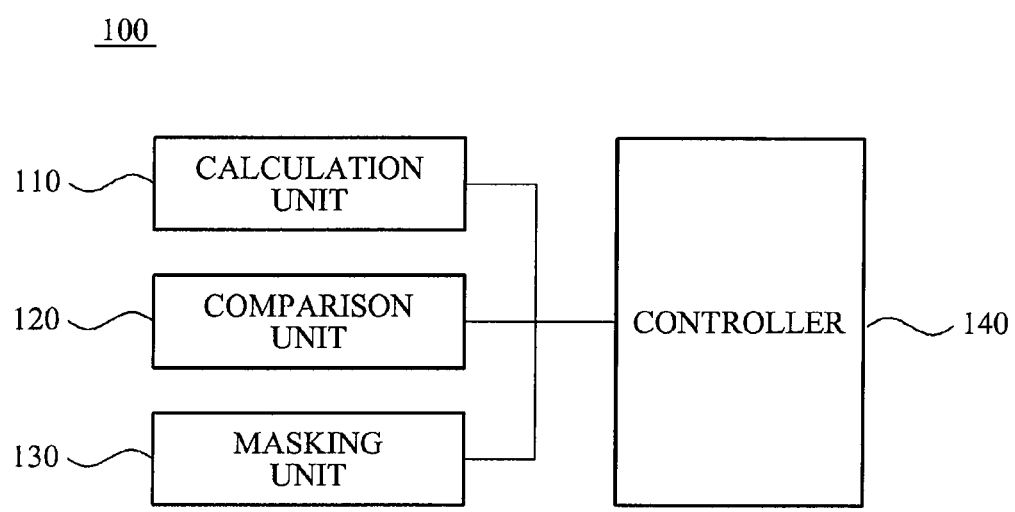
FIG. 1 is a block diagram illustrating an ultrasound color Doppler image system according to an exemplary embodiment of the present invention.

Reference will now be made in detail to example embodiments, examples of which are illustrated in the accompanying drawings, wherein like reference numerals refer to the like elements throughout. An ultrasound diagnosis apparatus utilizing a touch interaction is described below to explain the present disclosure by referring to the figures.

FIG. 1 illustrates an ultrasound color Doppler image system according to an exemplary embodiment of the present invention.

Referring to FIG. 1, an ultrasound color Doppler image system 100 may include a calculation unit 110, a comparison unit 120, a masking unit 130, and a controller 140.

The calculation unit 110 may calculate a mean phase and a mean magnitude of a first signal corresponding to a pixel of a color image in an ultrasound image, and may multiply, by a predetermined scale factor, the calculated mean phase and the calculated mean magnitude. Here, the color image may be an image before a clutter signal is eliminated, namely, an image including a blood flow and a peripheral tissue, such as a vessel wall, muscle, and the like. Also, the first signal may be an In-phase/Quadrature-phase signal (I/Q signal) per pixel or an I/Q signal per sample among an I/Q signal based on an ensemble unit or I/Q signal based on a frame unit.

In this instance, the calculation unit 110 may calculate the mean phase and the mean magnitude of the first signal (an I/Q signal) using a second signal (another I/Q signal) that has a temporal continuity with the first signal (the I/Q signal). As an example, when the calculation unit 110 calculates the mean phase and the mean magnitude of the first signal based on Equation 1 may be as given below:

$$MeanPhase(u, v) = \frac{\left(\sum_{k=0}^{EL-1} |\tan^{-1}(E(k, u, v) \times E(k+1, u, v)^*)|\right)}{n} \quad [\text{Equation 1}]$$

$$MeanMagn(u, v) = \frac{\left(\sum_{k=0}^{EL-1} (|E(k, u, v)| \times |E(k+1, u, v)^*|)\right)}{n}$$

Here, MeanPhase denotes the mean phase, MeanMagn denotes the mean magnitude, u denotes a scanline number, v denotes a sample number or a pixel number, k denotes an ensemble number, EL denotes a length of ensemble, * denotes a conjugated complex number, and E(k,u,v) denotes a modulated I/Q signal that is expressed in a form of a complex number (I+jQ).

The calculation unit 110 may generate a first multiplication value and a second multiplication value by multiplying a predetermined scale factor and each of a maximum value for the calculated mean phase and a maximum value for the calculated mean magnitude. Here, the scale factor may be set in advance depending on a user or a system environment.

Specifically, the calculation unit 110 may generate the first multiplication value by multiplying the maximum value for the mean phase, namely, a maximum mean phase, by the scale factor. Also, the calculation unit 110 may generate the second multiplication value by multiplying the maximum value for the mean magnitude, namely a maximum mean magnitude, by the scale factor.

The calculation unit 110 may calculate the maximum value for the calculated mean phase and the maximum value for the calculated mean magnitude based on an example, such as Equation 2 as given below. The calculation unit 110 may compare mean phases with each other to calculate the maximum value for the mean phase, and may compare mean magnitudes with each other to calculate the maximum value for the mean magnitude.

$$MaxPhase = \underset{init=0}{\overset{V}{\text{Max}}}\left(\underset{v=0}{\overset{U}{\text{Max}}}(MeanPhase(u, v), MaxPhase)\right) \quad [\text{Equation 2}]$$

$$MaxMagn = \underset{init=0}{\overset{V}{\text{Max}}}\left(\underset{v=0}{\overset{U}{\text{Max}}}(MeanMagn(u, v), MaxMagn)\right)$$

Here, MaxPhase denotes the maximum value for the mean phase, MaxMagn denotes the maximum value for the mean magnitude, u denotes a scanline number, v denotes a sample number or a pixel number, U denotes a maximum value for the scaneline, V denotes a maximum value for the sample number or the pixel number, MeanPhase denotes a mean phase, and MeanMagn denotes a mean magnitude.

For reference, the ultrasound color Doppler image system 100 may perform modulation based on a pixel unit with respect to all pixels in an I/Q signal based on an ensemble unit, before performing calculation by the calculation unit 110. Accordingly, the first signal may be modulated signal.

The comparison unit 120 may compare the generated first multiplication value, the generated second multiplication value with the calculated mean magnitude and the calculated mean phase, respectively. Specifically, the comparison unit 120 may compare the generated first multiplication value with the calculated mean phase, and may compare the generated second multiplication value with the calculated mean magnitude The masking unit 130 may perform masking of the corresponding pixel of the color image based on a comparison result.

As an example, when the first multiplication value is less than the mean phase and the second multiplication value is greater than the mean magnitude according to the comparison result (first multiplication value<mean phase & second multiplication value>mean magnitude), the masking unit 130 may perform masking of the corresponding pixel of the color image.

Also, when the first multiplication value is greater than the mean phase, and the second multiplication value is greater than the mean magnitude according to the comparison result (first multiplication value>mean phase & second multiplication value>mean magnitude), the masking unit 130 may perform masking of the corresponding pixel of the color image.

Also, when the first multiplication value is less than the mean phase, and the second multiplication value is less than the mean magnitude according to the comparison result (first multiplication value<mean phase & second multiplication value<mean magnitude), the masking unit 130 may perform masking of the corresponding pixel of the color image.

Conversely, when the first multiplication value is greater than the mean phase and the second multiplication value is less than the mean magnitude according to the comparison result (first multiplication value>mean phase & second multiplication value<mean magnitude), the masking unit 130 may not perform masking of the corresponding pixel of the color image.

This may be simply shown by Table 1 as given below:

TABLE 1

| | Comparison between first multiplication value with mean phase | Comparison between second multiplication value with mean magnitude | Making value |
|---|---|---|---|
| 1 | mean phase < scale factor × max mean phase | & mean magnitude > scale factor × max mean magnitude | 0 (Masking) |
| 2 | mean phase > scale factor × max mean phase | & mean magnitude < scale factor × max mean magnitude | 1 (No Masking) |
| 3 | mean phase > scale factor × max mean phase | & mean magnitude > scale factor × max mean magnitude | 0 (Masking) |
| 4 | mean phase < scale factor × max mean phase | & mean magnitude < scale factor × max mean magnitude | 0 (Masking) |

As shown in Table 1, the ultrasound color Doppler image system 100 may set a masking value as "0" or "1" depending on the comparison result between the first multiplication value and the mean phase and the comparison result between the second multiplication value and the mean magnitude. Accordingly, the masking unit 130 may perform masking of the corresponding pixel of the color image, when the masking value is "0". Conversely, the masking unit 130 may not perform masking of the corresponding pixel of the color image, when the masking value is "1".

The controller 140 may generally control an operation of the ultrasound color Doppler image system 100, such as operations of the calculation unit 110, the comparison unit 120, the masking unit 130, and the like.

Figure 2:
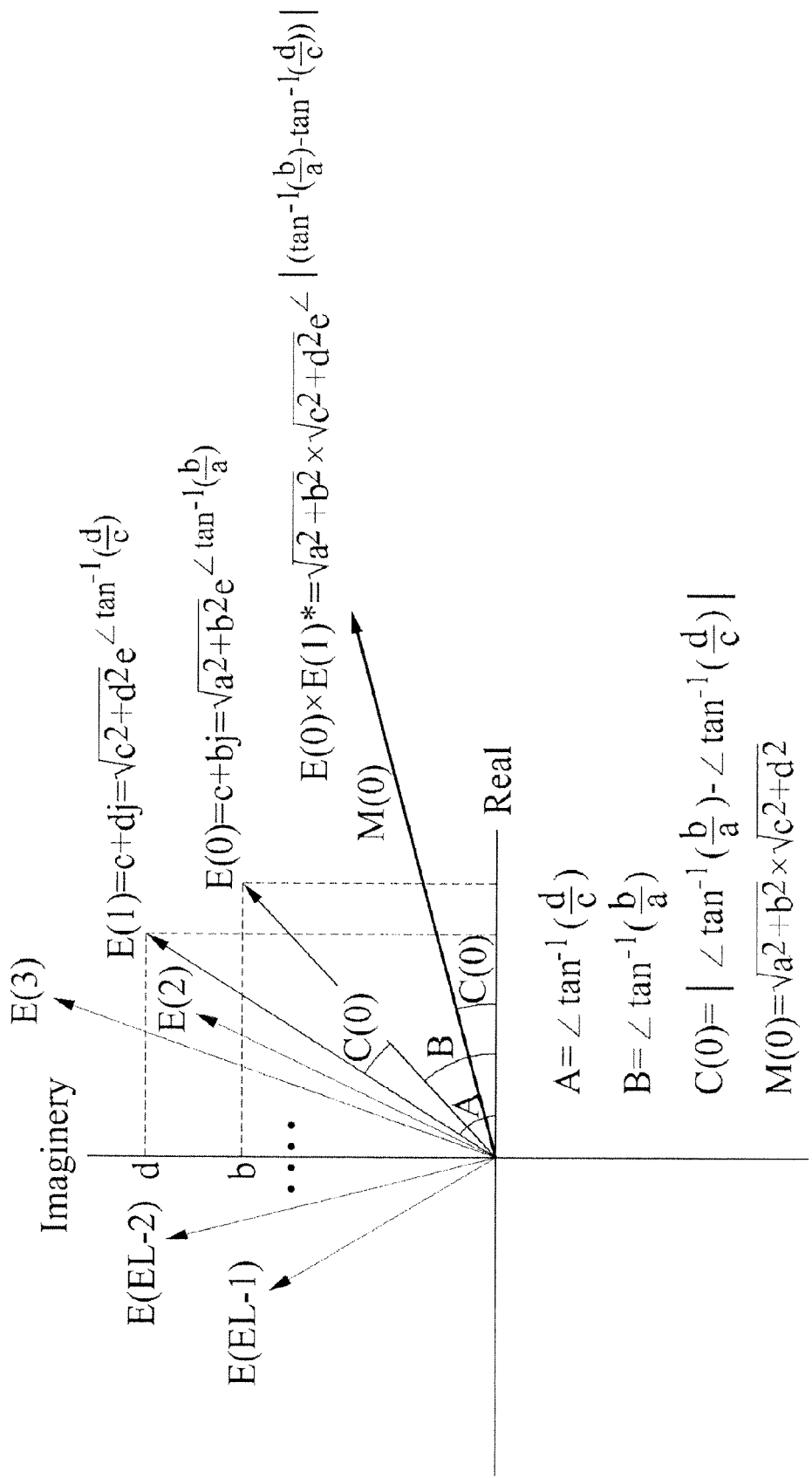
FIGS. 2 through 4 are diagrams illustrating an example of an phase and a magnitude of two successive signals in an ensemble I/Q signal according to an exemplary embodiment of the present invention.
Figure 3:
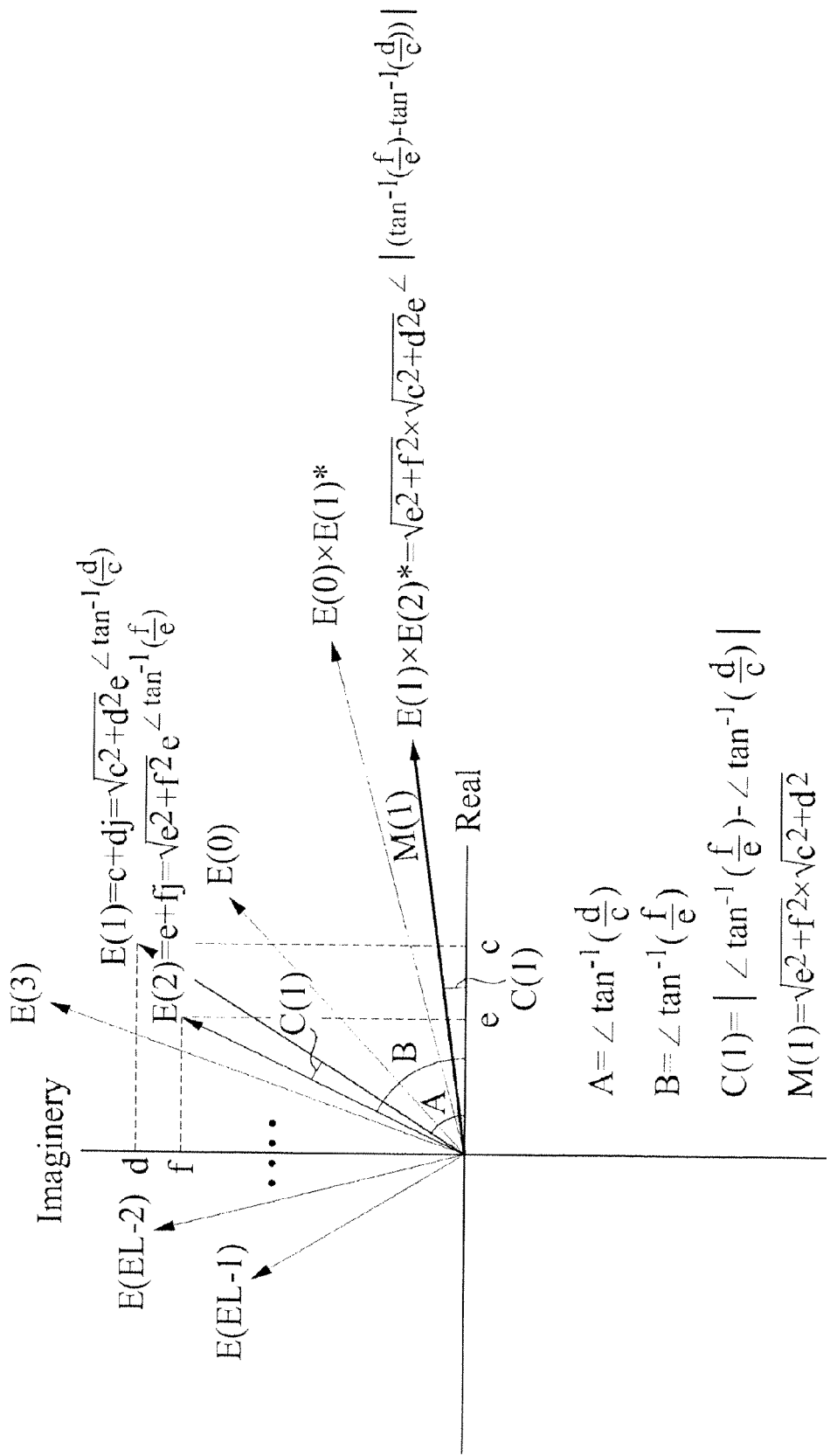
Figure 4:
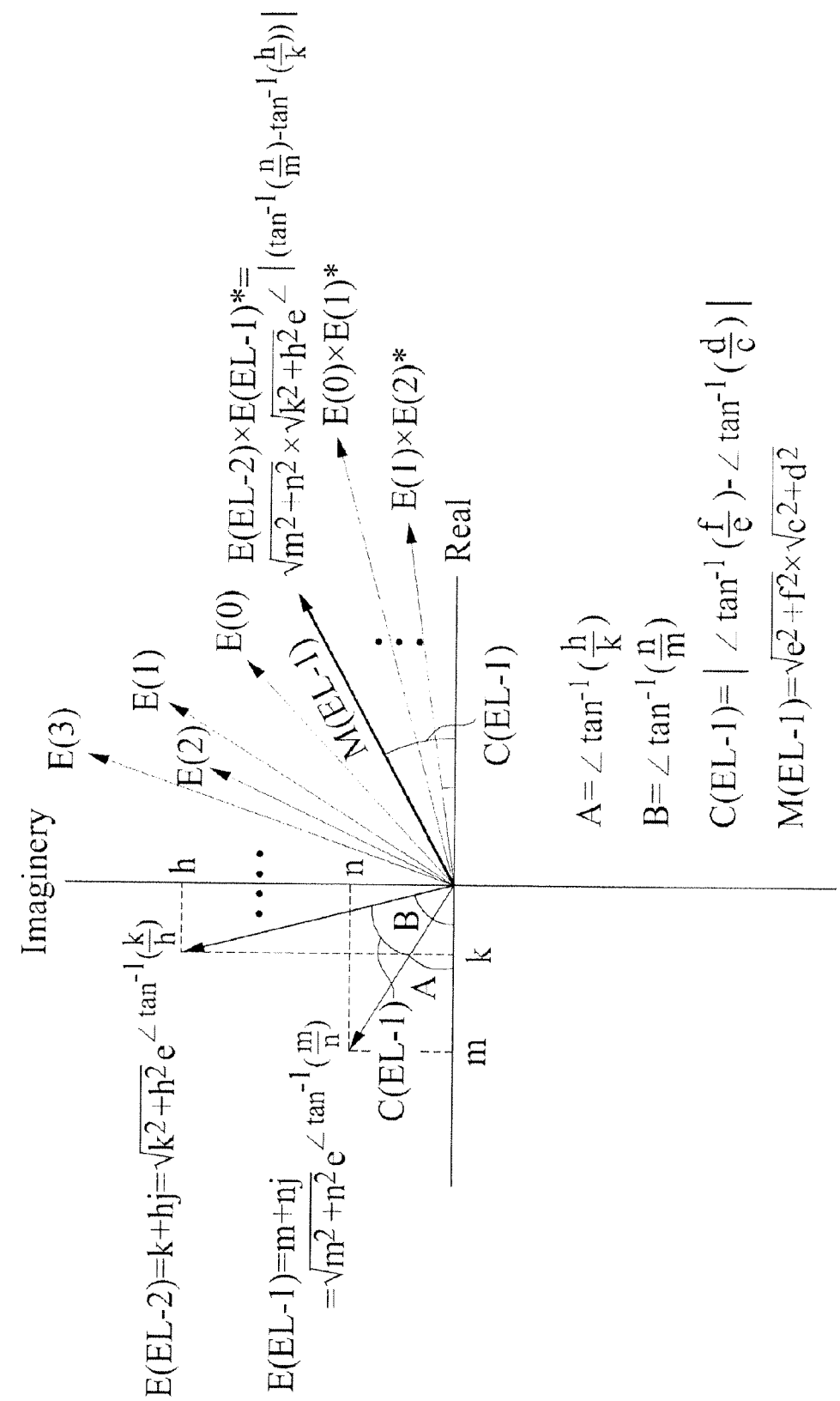

FIGS. 2 through 4 are diagrams illustrating an example of a phase and a magnitude of two successive signals in an ensemble I/Q signal according to an exemplary embodiment of the present invention.

A graph of modulated I/Q signals, namely, a graph of E(0), E(1), E(2), E(3), . . . , E(EL−2), and E(EL−1), is illustrated in FIGS. 2 through 4, a number of the modulated I/Q signals being same as an ensemble length that is a number of ultrasound beams to be used for calculating a color image of a single pixel. A phase and a magnitude of two temporally successive I/Q signals may be calculated using the two signals.

First, as illustrated in FIG. 2, the ultrasound Doppler image system 100 according to an exemplary embodiment of the present invention may calculate a phase and a magnitude of E(0) and E(1) using the two temporally successive signals, namely, E(0) and E(1).

Specifically, the ultrasound color Doppler image system 100 may multiply the two temporally successive signals, namely, E(0) and E(1), (E(0)×E(1\*)), and may calculate a phase $$\left(C(0) = \left|\angle\tan^{-1}\left(\frac{b}{a}\right) - \angle\tan^{-1}\left(\frac{d}{c}\right)\right|\right)$$

and a magnitude (M(0)=$\sqrt{a^2+b^2}\times\sqrt{c^2+d^2}$) of the two signals (E(0) and E(1)) from a multiplication result $$\left(\sqrt{a^2+b^2}\times\sqrt{c^2+d^2}\ e^{\angle\left|\tan^{-1}\left(\frac{b}{a}\right)-\tan^{-1}\left(\frac{d}{c}\right)\right|}\right).$$

As illustrated in FIG. 3, the ultrasound color Doppler image system 100 may calculate a phase and a magnitude of temporally successive two signals, namely, E(1) and E(2) using E(1) and E(2).

Specifically, the ultrasound color Doppler image system 100 may multiply the two temporally successive signals, namely, E(1) and E(2), (E(1)×E(2\*)), and may calculate a phase $$\left(C(1) = \left|\angle\tan^{-1}\left(\frac{f}{e}\right) - \angle\tan^{-1}\left(\frac{d}{c}\right)\right|\right)$$

phase and a magnitude (M(1)=$\sqrt{e^2+f^2}\times\sqrt{c^2+d^2}$) of the two signals (E(1) and E(2)) from a multiplication result $$\left(\sqrt{a^2+b^2}\times\sqrt{c^2+d^2}\ e^{\angle\left|\tan^{-1}\left(\frac{f}{e}\right)-\tan^{-1}\left(\frac{d}{c}\right)\right|}\right).$$

The ultrasound color Doppler image system 100 may continuously calculate a phase and a magnitude of each of two other signals, such as E(2) and E(3), E(3) and E(4), . . . , and E(EL−3) and E(EL−2) in the same manner as described with reference to FIGS. 2 and 3, and when a phase and a magnitude of E(EL−2) and E(EL−1) is calculated based on a method of FIG. 4, phases and magnitudes of each pixel or each sample in an ensemble I/Q signal, namely the color image, are completely calculated.

As illustrated in FIG. 4, the ultrasound color Doppler image system 100 may multiply two temporally successive signals, namely, E(EL−2) and E(EL−1), ((E(EL−2)×E(EL−1)\*), and may calculate a phase $$\left(C(EL-2) = \left|\angle\tan^{-1}\left(\frac{n}{m}\right) - \angle\tan^{-1}\left(\frac{h}{k}\right)\right|\right)$$

and a magnitude (M(EL−2)=$\sqrt{m^2+n^2}\times\sqrt{k^2+h^2}$) of the two signals (E(EL−2), E(EL−1)) from a multiplication result $$\left(\sqrt{m^2+n^2}\times\sqrt{k^2+h^2}\ e^{\angle\left|\tan^{-1}\left(\frac{n}{m}\right)-\tan^{-1}\left(\frac{h}{k}\right)\right|}\right).$$

As described above, the ultrasound color Doppler image system 100 may calculate phases and a magnitudes of each pixel or each sample in the ensemble I/Q signal, namely, the color image, using two temporally successive signals. Accordingly, the ultrasound color Doppler image system 100 may calculate the mean phase and the mean magnitude as illustrated in FIG. 3 based on the phases and magnitudes calculated in FIGS. 2 through 4.

$$\text{MeanPhase} = \frac{\left(\sum_{k=0}^{EL-1} C(k)\right)}{n} \quad \text{[Equation 3]}$$

$$\text{MeanMagnitude} = \frac{\left(\sum_{k=0}^{EL-1} C(k)\right)}{n}.$$

Here, Meanphase denotes a mean phase, MeanMagnitude denotes a mean magnitude, n denotes a total number of phases and a total number of magnitudes, $$\sum_{k=0}^{EL-1} C(k)$$

denotes a total sum of phases, and $$\sum_{k=0}^{EL-1} M(k)$$

denotes a total sum of magnitudes.

Figure 5:
FIG. 5 is a diagram illustrating an example of masking a pixel in a color image according to an exemplary embodiment of the present invention.

FIG. 5 illustrates an example of masking a pixel in a color image according to an exemplary embodiment of the present invention. For reference, in FIG. 5, each square block denotes a pixel, and a number in the square block denotes a pixel number. Also, numbers "0" and "1" in a right side of a black block and a white block denote a masking value.

As illustrated in FIG. 5, a masking value corresponding to pixel numbers 1, 2, 4, 5, 9, 11, 12, 13, and 14 is "0", and a masking value corresponding to pixel numbers 3, 6, 7, 8, 10, 15, and 16 is "1".

Accordingly, the ultrasound color Doppler image system 100 may perform masking of pixels masking values of which are "0", namely, the pixels corresponding to the pixel numbers 1, 2, 4, 5, 9, 11, 12, 13, and 14. The corresponding pixels are marked in oblique lines and the corresponding pixels may be marked in black when actually embodied.

Conversely, the ultrasound color Doppler image system may not perform masking of pixels masking values of which are "1", namely, the pixels corresponding to the pixel numbers 3, 6, 7, 8, 10, 15, and 16.

As described above, the ultrasound color Doppler image system 100 may set the masking value through a process, such as calculation, comparison, and the like, with respect to each pixel of the color image, and may perform masking of a corresponding pixel according to a predetermined masking value. Accordingly, a flash artifact component may be effectively eliminated from a color Doppler image according to an exemplary embodiment of the present invention.

Figure 6:
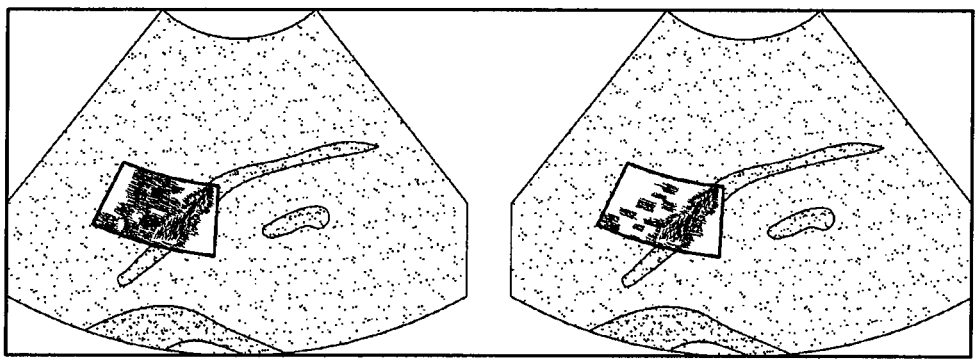
FIG. 6 is a diagram illustrating an image before eliminating a flash artifact from a color Doppler image and an image after eliminating the flash artifact from the color Doppler image according to an exemplary embodiment of the present invention.

As described above, the ultrasound color Doppler image system may effectively eliminate the flash artifact component from the color Doppler image, thereby providing a more accurate Doppler image as illustrated in FIG. 6. For reference, FIG. 6 illustrates an image (left image) before eliminating a flash artifact from a color Doppler image and an image (right image) after eliminating the flash artifact from the color Doppler image according to an exemplary embodiment of the present invention FIG. 7 illustrates a method of filtering a clutter signal in an ultrasound color Doppler image system according to an exemplary embodiment of the present invention.

Figure 7:
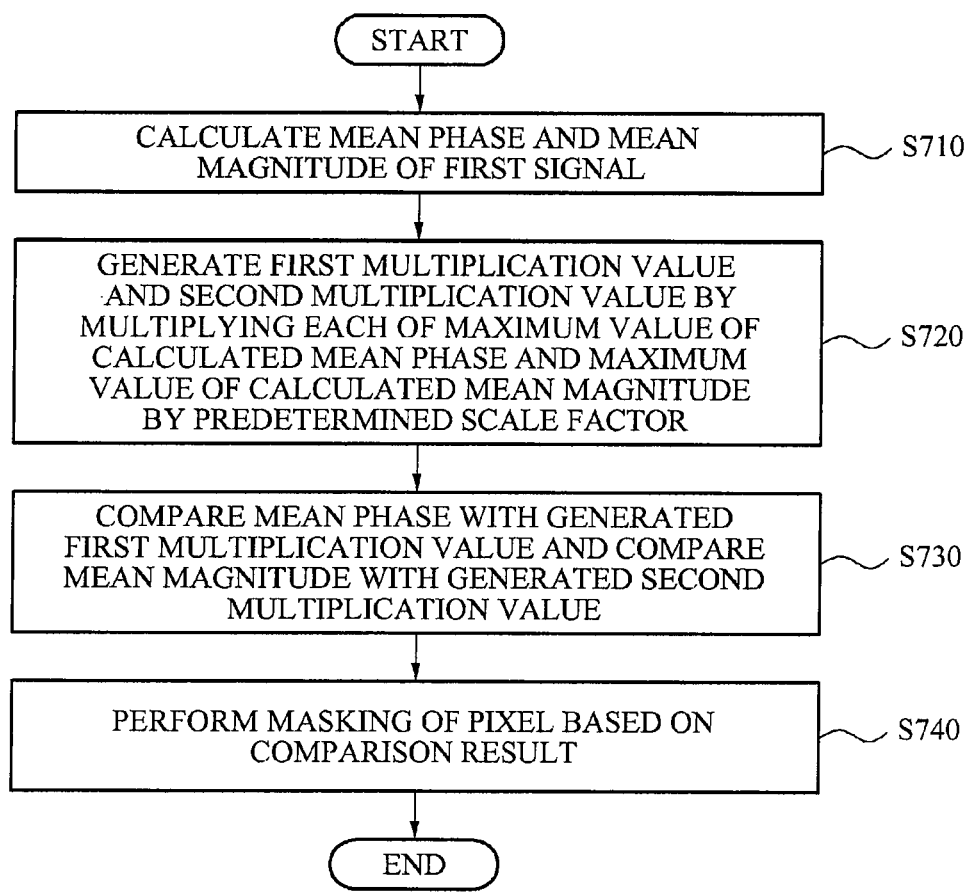
FIG. 7 is a flowchart illustrating a method of filtering a clutter signal in an ultrasound color Doppler image system according to an exemplary embodiment of the present invention.

Referring to FIG. 7, the ultrasound color Doppler image system 100 may calculate a mean phase and a mean magnitude of a first signal corresponding to a pixel of a color image in the ultrasound image in operation S710. Here, the color image may be an image before a clutter signal is eliminated, namely, an image including a blood flow and a peripheral tissue, such as a vessel wall, a muscle, and the like. Also, the first signal may be an I/Q signal per pixel or an I/Q signal per sample among an I/Q signal based on an ensemble unit.

In this instance, the ultrasound color Doppler image system may calculate a mean phase and a mean magnitude of the first signal using the first signal and a second signal that has a temporal continuity with the first signal.

Subsequently, the ultrasound color Doppler image system 100 may generate a first multiplication value and a second multiplication value by multiplying each of a maximum value for the calculated mean phase and a maximum value for the calculated mean magnitude by a predetermined scale factor. Here, the scale factor may be set by a user in advance, and may include positive numbers, such as 1, 1.5, 2, 2.5, and the like, as coefficients for scaling.

Specifically, the ultrasound color Doppler image system 100 may generate the first multiplication value by multiplying the scale factor and the maximum value for the calculated mean phase, namely a maximum mean phase (scale factor× maximum mean phase). Also, the ultrasound color Doppler image system may generate the second multiplication value by multiplying the scale factor and the maximum value for the calculated mean magnitude, namely a maximum mean magnitude (scale factor×maximum mean magnitude).

Subsequently, the ultrasound color Doppler image system 100 may compare the generated first multiplication value and the generated second multiplication value with each of the mean phase and the mean magnitude.

Specifically, the ultrasound color Doppler image system 100 may compare the first multiplication value with the mean phase, and may compare the second multiplication value with the mean magnitude.

Subsequently, the ultrasound color Doppler image system may perform masking of the corresponding pixel of the color image based on the comparison result in operation S740.

As an example, when the first multiplication value is less than the mean phase and the second multiplication value is greater than the mean magnitude according to the comparison result (first multiplication value<mean phase & second multiplication value>mean magnitude), the ultrasound color Doppler image system 100 may perform masking of the corresponding pixel of the color image.

When the first multiplication value is greater than the mean phase, and the second multiplication value is greater than the mean magnitude according to the comparison result (first multiplication value>mean phase & second multiplication value>mean magnitude), the ultrasound color Doppler image system 100 may perform masking of the corresponding pixel of the color image.

When the first multiplication value is less than the mean phase, and the second multiplication value is less than the mean magnitude according to the comparison result (first multiplication value<mean phase & second multiplication value<mean magnitude), the ultrasound color Doppler image system may perform masking of the corresponding pixel of the color image.

Conversely, when the first multiplication value is greater than the mean phase, and the second multiplication value is less than the mean magnitude according to the comparison result (first multiplication value>mean phase & second multiplication>mean magnitude), the ultrasound color Doppler image system 100 may not perform masking of the corresponding pixel of the color image.

As described above, the ultrasound color Doppler image system 100 may determine whether to perform the masking of each pixel in the color image through a calculation and a comparison, and may perform masking of a corresponding pixel. Accordingly, example embodiments may effectively eliminate a flash artifact component from the color Doppler image by filtering a clutter signal from a Doppler signal.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few example embodiments have been shown and described, it would be appreciated by those skilled in the art that changes may be made in these example embodiments without departing from the principles and spirit of the invention, the scope of which is defined in the claims and their equivalents.

What is claimed is:

1. An ultrasound color Doppler image system, the system comprising:
   a calculator calculation unit comprising a computer and configured to calculate, for each frame, a mean value associated with an in-phase/quadrature (I/Q) signal corresponding to a pixel of a color image in an ultrasound image, and to generate a multiplication value using the calculated mean value;
   a comparator comparison unit comprising a computer and configured to compare the generated multiplication value with the mean value; and
   a mask setter masking unit comprising a computer and configured to perform masking of the pixel based on a comparison result,
   wherein the calculator calculation unit is further configured to calculate the mean value of the I/Q signal for each frame, select a maximum mean value based on scales of the calculated mean value, and generate the multiplication value by multiplying the selected maximum mean value and a predetermined scale factor.

2. The system of claim 1, wherein the calculation unit is further configured to:
   calculate a mean phase and a mean magnitude as the mean value,
   generate a first multiplication value associated with the mean phase, and
   generate a second multiplication value associated with the mean magnitude.

3. The system of claim 2, wherein the comparison unit is configured to: compare the first multiplication value with a mean phase calculated for a frame that is a target of the masking; and
   compare the second multiplication value with a mean magnitude calculated for the frame that is the target of the masking.

4. The system of claim 2, wherein the masking unit is configured to perform the masking of the pixel for the frame that is the target of the masking, when a case corresponds to one of:
   (1) where the first multiplication value is less than the mean phase, and the second multiplication value is greater than the mean magnitude;
   (2) where the first multiplication value is greater than the mean phase, and the second multiplication value is greater than the mean magnitude as a result of the comparison; and
   (3) where the first multiplication value is less than the mean phase and the second multiplication value is less than the mean magnitude.

5. The system of claim 2, wherein the calculation unit is further configured to calculate the mean phase and the mean magnitude based on the I/Q signal and another I/Q signal having a temporal continuity with the I/Q signal.

6. A method of filtering a clutter signal in an ultrasound color Doppler image system, the method comprising:
   calculating, for each frame, a mean value associated with in-phase/quadrature (I/Q) signal corresponding to a pixel of a color image in an ultrasound image, by a calculation unit implemented with a hardware device;
   generating, by the calculation unit, a multiplication value using the calculated mean value;
   comparing, by a comparison unit implemented with a hardware device, the generated multiplication value with the mean value; and
   performing, by a masking unit implemented with a hardware device, a masking of the pixel based on a comparison result,
   wherein the generating of the multiplication value includes:
   selecting a maximum mean value based on scales of the calculated mean value; and
   generating the multiplication value by multiplying the selected maximum mean value and a predetermined scale factor.

7. The method of claim 6, wherein, when a mean phase and a mean magnitude are calculated as the mean value, the generating of the multiplication value further comprises:
   generating a first multiplication value associated with the mean phase and a second multiplication value associated with the mean magnitude.

8. The method of claim 7, wherein the comparing of the generated multiplication value with the mean value comprises:
   comparing the first multiplication value with a mean phase for a frame that is a target of the masking; and
   comparing the second multiplication value with a mean magnitude for the frame that is the target of the masking.

9. The method of claim 7, wherein the masking of the pixel for the frame that is the target of the masking is performed, when a case corresponds to one of:
   (1) where the first multiplication value is less than the mean phase, and the second multiplication value is greater than the mean magnitude;

(2) where the first multiplication value is greater than the mean phase, and the second multiplication value is greater than the mean magnitude as a result of the comparison; and (3) where the first multiplication value is less than the mean phase and the second multiplication value is less than the mean magnitude.

10. The method of claim 7, wherein the calculating of the mean value comprises calculating the mean phase and the mean magnitude based on the I/Q signal and another I/Q signal having a temporal continuity with the I/Q signal.

11. A non-transitory computer readable recording medium storing a program implementing a method of filtering a clutter signal in an ultrasound color Doppler image system, the method comprising:

calculating, for each frame, a mean value associated with inphase/quadrature (I/Q) signal corresponding to a pixel of a color image in an ultrasound image;

generating a multiplication value using the calculated mean value;

comparing the generated multiplication value with the mean value; and performing a masking of the pixel based on a comparison result;

wherein the generating of the multiplication value performs:

selecting a reference maximum value based on scales of calculated mean values; and generating the multiplication value by multiplying the selected maximum mean value and a predetermined scale factor.

* * * * *